Feb. 27, 1923.
S. G. CRANE
1,446,963
AUTOMATIC WEIGHING AND TOTALING SCALE
Filed Nov. 21, 1919
4 sheets-sheet 1
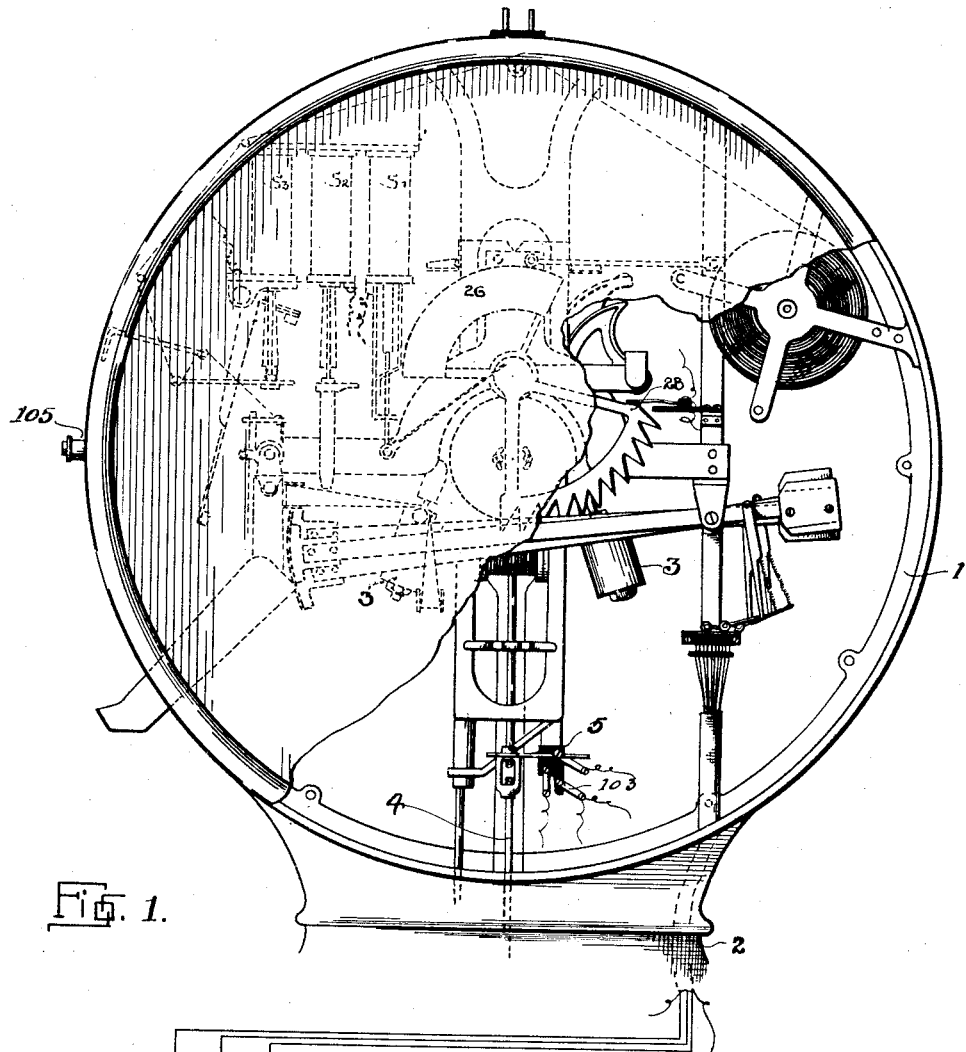
Fig. 1.
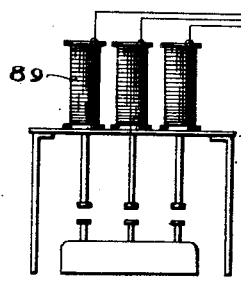
Witnesses
C. E. Hilcox
Inventor
Samuel G. Crane.
By George R. Frye
Attorney

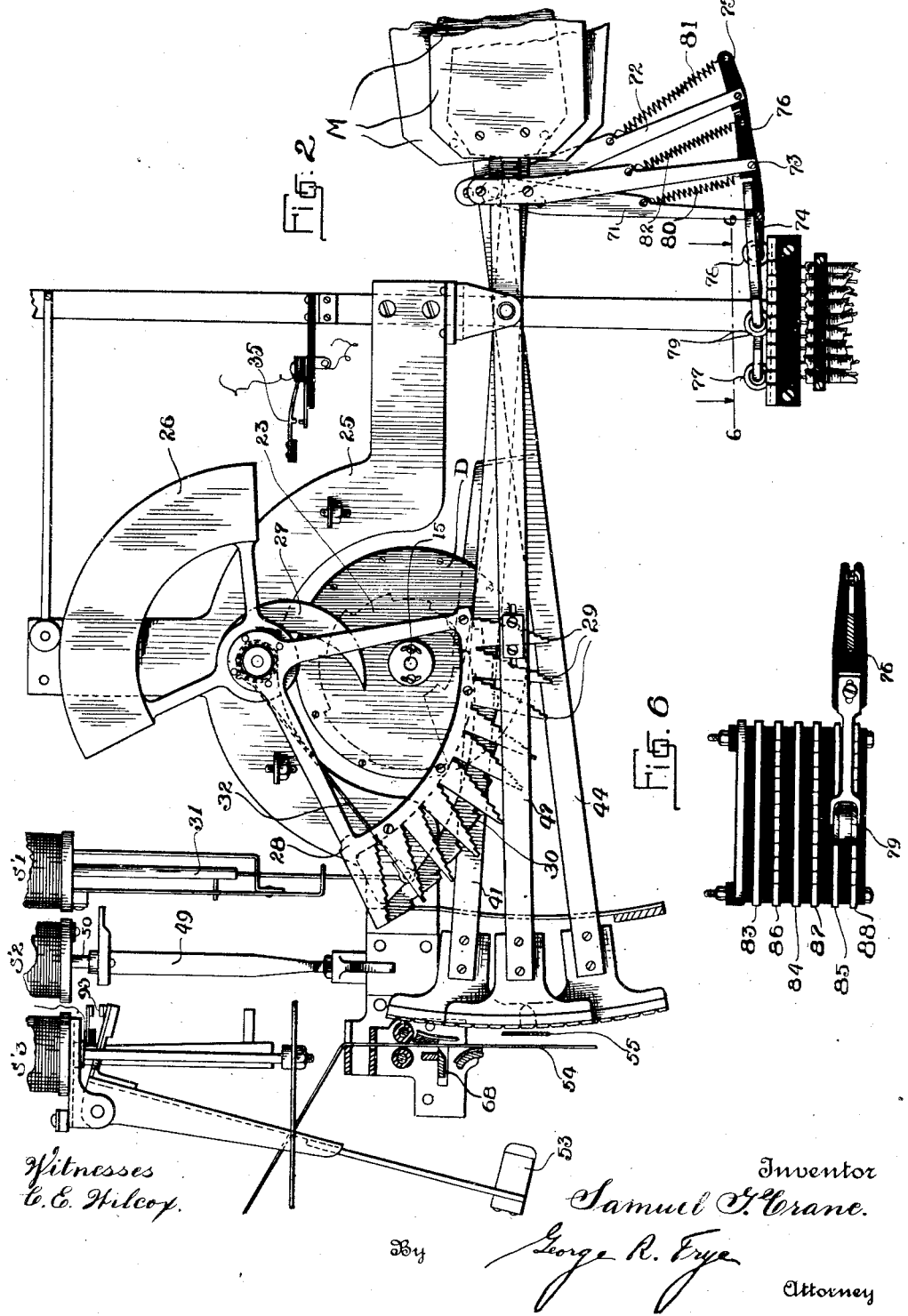

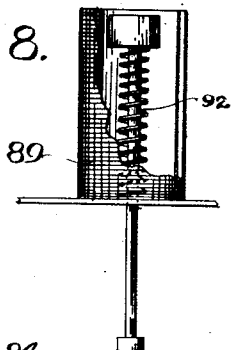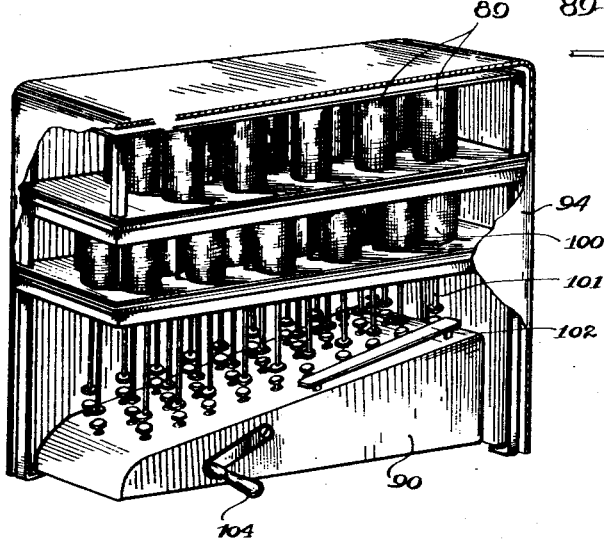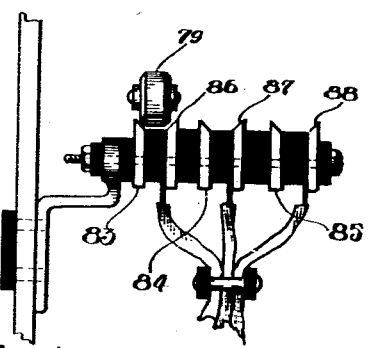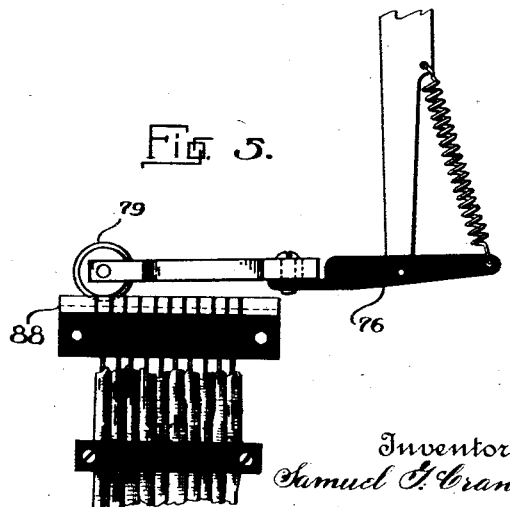

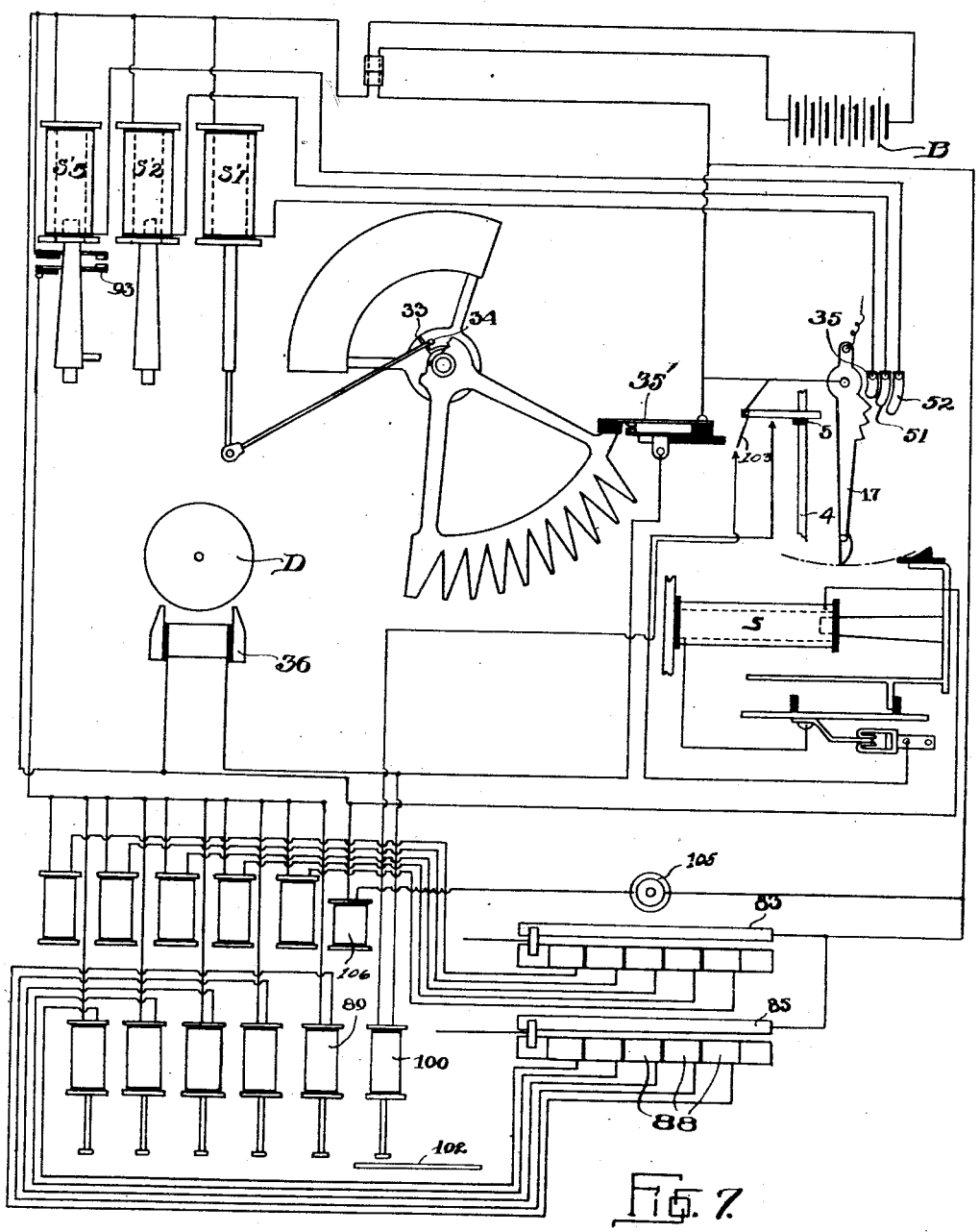

Patented Feb. 27, 1923.

1,446,963

UNITED STATES PATENT OFFICE.

SAMUEL G. CRANE, OF TOLEDO, OHIO, ASSIGNOR TO TOLEDO SCALE COMPANY, OF TOLEDO, OHIO, A CORPORATION OF NEW JERSEY.

AUTOMATIC WEIGHING AND TOTALING SCALE.

Application filed November 21, 1919. Serial No. 339,686.

*To all whom it may concern:*

Be it known that I, SAMUEL G. CRANE, a citizen of the United States, residing at Toledo, in the county of Lucas and State of Ohio, have invented certain new and useful Improvements in Automatic Weighing and Totaling Scales, of which the following is a specification.

This invention relates to weighing scales and particularly to scales for automatically printing and totaling the weights of loads weighed thereon.

The principal object of the invention is to provide a scale which will automatically determine the weight of each of a plurality of loads, print the same, find the sum of the weights, and print the total. Thus, the total weight of any lot of goods may be automatically found and recorded, even though the lot is divided into packages that must be separately weighed. When the scale is operated in connection with a conveyor system supplying articles of unknown weights in rapid succession, a printed record may be made without the assistance of a weight-checking clerk.

Another object of the invention is to provide a device for automatically actuating adding machines of known construction for recording individual and totalized weights.

Another object is to provide an adding machine attachment to co-operate with automatic weighing mechanism of known construction.

Still another object is to provide an adding machine attachment that may be used with scale-operated means for printing individual weight checks.

With the above and other objects in view which will readily appear as the invention is better understood, my invention consists in the novel construction, combination and arrangement of parts to be hereinafter more fully described and particularly pointed out in the subjoined claims.

Reference is to be had to the accompanying drawings illustrating a preferred embodiment of my invention and wherein similar reference numerals designate similar parts throughout the several views.

In the drawings:—

Figure 1 is a rear elevation of the head mechanism of an automatic scale embodying my invention, part of the housing being broken away to show mechanism for actuating the adding machine, part of the weighing and printing mechanisms being shown in dotted lines, and the adding machine and operating mechanism therefor being shown somewhat diagrammatically;

Figure 2 is a detail elevational view of the adding machine controlling mechanism showing a portion of the check-printing mechanism in conjunction therewith;

Figure 3 is a perspective view of the adding machine operating device, with a portion of the housing broken away to show the adding machine and electrically-operated tappets;

Figure 4 is an end elevation of the commutator controlling the adding machine.

Figure 5 is a side elevation of the commutator;

Figure 6 is a plan view thereof;

Figure 7 is a diagrammatic view of the various circuits and parts operated thereby; and Figure 8 is an elevation of one of the tappet-actuating solenoids, with parts broken away to show the core.

While the adding machine attachment shown herein is adaptable for use with scales having load-offsetting means of various types, such as lever, spring and pendulum, it is particularly adapted for use with automatic weighing mechanism, and I have illustrated it in combination with a scale of well-known construction, in which the weighing mechanism is of the type shown in U. S. Patent No. 1,203,611, to Hapgood, dated November 7, 1916. Since the weighing mechanism is well known and the printing mechanism is specifically shown and described in my co-pending application Ser. No. 339,688, filed on even date herewith, I have illustrated and will herein describe the weighing and printing mechanisms only in such detail as will serve clearly to bring out their co-operation with the adding machine mechanism.

In the drawings I have shown the housing 1 supported on the column 2, which in turn is adapted to be supported upon the base housing the platform lever mechanism (not shown). The housing contains the automatic load-offsetting mechanism and the indicating mechanism. The load-offsetting mechanism comprises a pair of pendulums 3 operatively connected through the steelyard 4 with the platform lever mechanism, the parts being so arranged that when a load is placed on the platform a downward pull is exerted on the steelyard 4, which causes the pendulums 3 to swing upwardly and outwardly, thereby offsetting or balancing the load.

Supported within the housing and arranged to be opened by movement of the steelyard 4 from zero position is a master switch 5 in circuit with a source of current and a solenoid S operating a timing device controlling a contact arm 17 which successively engages contacts 35, 51 and 52 and thereby energizes solenoids S', S² and S³ to actuate the check-printing means and the means hereinafter described controlling the totaling device. The timer may be located at any point within or without the scale.

The load-offsetting mechanism is connected in any convenient manner, preferably that described in the hereinbefore mentioned patent to Hapgood, to an indicator shaft 15 so that said shaft is given a rotative movement proportional to the load on the scale, the capacity of the scale being the weight necessary to cause the shaft 15 to make a complete revolution. The specific printing and adding mechanism shown in this application is adapted for co-operation with a scale having a capacity of 1000 lbs., but the capacity of the device may be varied at will to suit conditions, the mechanism herein shown being, of course, merely illustrative.

Carried upon the shaft 15 is a plate 23, shown in dotted lines in Figure 2, the said plate having its periphery made up of a stepped series of concentric arcs each subtending an angle of 36° at the axis of the shaft 15. When the plate 23 is in weighing position, the lowermost arc forms a stop to limit the movement of a pivoted bar 41 carrying a series of printing type at one end and connected at its other end to a commutator forming part of an adding machine operating mechanism later to be described. If, as in this case, the capacity of the scale is 1000 lbs. and the periphery of the plate is made up of ten arcs, the position of the bar will vary with each 100 lbs. of weight on the platform. This bar is used to control (in a manner to appear later) the keys of an adding machine which register hundreds.

Pivotally mounted on a bracket 25 secured to the frame of the scale is a sector 26 carrying a substantially semi-crescent-shaped stop member 27, and rigidly secured to said sector 26 and pivoted to swing therewith is a sector 28 having a series of stepped peripheral projections 29. Rigidly secured to said sector 28 is a plate 30, the outer edge of which is formed of a series of stepped concentric arcs. The center of mass of the pivoted member is so located that the member tends to swing in a clockwise direction, but such movement is normally prevented by the weight of the core 31 of the solenoid S', said core being connected to the pivoted member by means of a rod 32 which passes loosely through an ear 33 on the hub of said member and is headed at 34 to form a lost motion connection therewith. The shaft 15 carries a circular plate D having a series of pins 24 projecting from one face thereof parallel to the axis of said shaft and so spaced that the spaces between them register radially with the arcs forming the periphery of the plate 23. When the core 31 is raised by the solenoid S', the pivoted member swings by gravity in a clockwise direction until the semi-crescent-shaped stop 27 engages one of the pins 24. The stop member 27 is so shaped and the pins 24 are so arranged that the angular movement of the pivoted member will be directly proportional to the excess of load on the scale over the greatest multiple of 100 lbs. contained therein.

The lower edge of the plate 30 acts as a stop to limit the pivotal movement of the bar 44 carrying a series of printing type at one end and connected at its other end to the commutator forming a part of the adding machine mechanism. Since the edge of the plate is made up of ten concentric arcs of progressively shorter radii, the position in which the bar 44 will be stopped will be higher for each 10 lbs. in excess of a multiple of 100. The bar 44 is used to control the keys of an adding machine which registers tens.

The stepped edges of each of the ten projections 29 are substantially identical, and are so arranged that a pivoted bar 47, the movement of which is limited by the sector 28, may swing farther for each pound of load in excess of the multiple of 10. The bar 47 is used to control the operation of adding machine keys which register units.

At the beginning of the swinging movement of the sector 28 the switch 35' is allowed to close, energizing the magnet 36, which, with the plate D, forms a magnetic clutch to lock the indicating mechanism. The sector 28, having swung to position, the core 50 is raised by the solenoid S², and the member 49 is thereby lifted from the bars 41, 44 and 47. These bars are provided at their ends with weights W which cause them to swing into engagement respectively with the plates 23, 28 and 30.

The device for printing a separate check for each load which I have shown in connection with the adding machine operating mechanism consists essentially of a printing hammer 53 operated by the solenoid S³ to drive the end portion of a strip of paper 54 against an inking ribbon which overlies the type carried by the bars 41, 44 and 47.

A suitable knife 68 is provided to sever the printed check. The adding machine mechanism may also obviously be operated in conjunction with other check-printing mechanism or in conjunction with a scale not provided with separate check-printing mechanism.

Carried by the weighted ends of the bars 41, 44 and 47 are downwardly-extending arms 71, 72 and 73, and pivotally mounted upon the lower ends of said downwardly-extending arms are small levers 74, 75 and 76 of non-conducting material carrying in adjustable brackets at their ends contact rollers 77, 78 and 79. Light retractile springs 80, 81 and 82 hold the rollers in engagement with insulated integral bars 83, 84 and 85 and insulated segmental bars 86, 87 and 88.

The rollers and insulated solid and segmental contact bars form a commutator or electric selector by means of which the solenoids 89 are energized to operate the keys of an adding machine 90. In order that the solenoids may be placed directly above respective keys of the adding machine, they are arranged in two banks. The center of the core of each solenoid is held above the center of the solenoid by means of a small brass spring 92, and a key-operating tappet depends from each solenoid core to a point above the corresponding key of the adding machine. Each solenoid 89 is connected to one of the segments 88 and through the switch 93 to one pole of the source of current B. Any suitable means may be used to close the switch 93 after the rollers 77, 78 and 79 come to rest on the proper segments. I have, for illustration, herein shown the switch 93 as operated by the solenoid $S^3$. The bars 83, 84 and 85 are connected to the other pole of the battery.

As the bars 41, 44 and 47 swing through arcs limited by the plates 23, 28 and 30, the rollers 77, 78 and 79 move along the solid and segmental bars of the commutator until connection is established between each of the solid bars and a segment connected to the solenoid placed above the adding machine key adapted to register the weight which determines the position of the roller. As the core of the solenoid $S^3$ moves upwardly it closes the switch 93 and thereby energizes the previously selected solenoids to depress the tappets and operate the proper adding machine keys. The tappets may, if desired, be faced with fiber, rubber or other yielding material. By lifting the housing 94 the adding machine is accessible and may be withdrawn for use elsewhere without disturbing the other parts of the mechanism.

For the purpose of causing the adding machine to print the weights of successive loads a solenoid 100 is placed in juxtaposition to the solenoid 80 and provided with a tappet 101 adapted to operate the printing key or bar 102 of the adding machine. The solenoid 100 is in circuit with a circuit consisting of the contact to be engaged by a resilient arm 103 on the movable member of the switch 5. Thus, when the scale returns to zero position the solenoid 100 is momentarily energized and the printing key operated.

The total may be printed by operating the handle 104 of the adding machine or if the device be used with an electrically operated adding machine a solenoid 106, similar to the solenoid 100, may be located at the other side of the machine for operating the totaling key. The solenoid may be energized by pressing a push button 105 located on the scale housing.

While it will be apparent that the illustrated embodiment of my invention herein disclosed is well calculated to adequately fulfill the objects primarily stated, it is to be understood that the invention is susceptible to variation, modification and change within the spirit and scope of the subjoined claims.

Having described my invention, I claim:

1. In a device of the class described, in combination, weighing mechanism, a set of adding machine operating tappets, and means controlled by said weighing mechanism for selectively operating said tappets.

2. In a device of the class described, in combination, weighing mechanism, key-operating tappets, means controlled by said weighing mechanism for selecting certain of said tappets, and means for actuating the selected tappets.

3. In a device of the class described, in combination, weighing mechanism, key-operating tappets, electric means for operating said tappets, and means controlled by said weighing mechanism for controlling said electric operating means.

4. In a device of the class described, in combination, weighing mechanism, a set of key-operating tappets, a solenoid for each tappet, means controlled by said weighing mechanism for selecting certain of said solenoids, and means controlled by said weighing mechanism for energizing the selected solenoids.

5. In a device of the class described, in combination, weighing mechanism, a set of key-operating tappets, electric means for operating each of said tappets, and means controlled by the weighing mechanism for selectively establishing actuating circuits for said electric operating means.

6. In a device of the class described, in combination, weighing mechanism, a set of key-operating tappets, solenoids for operating said tappets, and means controlled by the weighing mechanism for selectively energizing said solenoids.

7. In a device of the class described, in combination, weighing mechanism, adding mechanism, and a commutator controlled by said weighing mechanism and controlling said adding mechanism.

8. In a device of the class described, in combination, weighing mechanism, adding and printing mechanism, and a commutator controlled by said weighing mechanism and controlling said adding and printing mechanism.

9. In a device of the class described, in combination, weighing mechanism, adding mechanism, a commutator controlling said adding mechanism, said commutator including a series of mutually insulated contacts and a contact movable relatively thereto, and means controlled by said weighing mechanism for moving the last said contact into engagement with one of said mutually insulated contacts.

10. In a device of the class described, in combination, weighing mechanism, adding mechanism, a commutator controlling said adding mechanism, said commutator including a series of mutually insulated contacts and a roller movable thereover, and means controlled by said weighing mechanism for moving said roller into engagement with any one of said mutually insulated contacts.

11. In a device of the class described, in combination, weighing mechanism, tappets for operating the keys of an adding machine to register tens and multiples thereof, means for actuating said tappets, said means being controlled by movement of the weighing mechanism to offset the weight of loads in excess of nine units, a set of tappets for operating adding machine keys registering from 1 to 9 inc., and means for actuating the tappets of said set, the last said means being controlled by movement of the weighing mechanism to offset odd units of weight.

12. In a device of the class described, in combination, weighing mechanism, a set of tappets for operating the units keys of an adding machine, a set of tappets for operating the tens keys thereof, and a set of tappets for operating the hundreds keys thereof, means for operating said tappets, and a selector for each set of tappets, said selector being controlled respectively by movement of the weighing mechanism to offset corresponding portions of the load on the scale.

13. In a device of the class described, in combination, weighing mechanism, a set of tappets for operating the units keys of an adding machine, a set of tappets for operating the tens keys thereof, and a set of tappets for operating the hundreds keys thereof, electric means for operating said tappets, and a selector for each set of tappets, said selector being controlled respectively by movement of the weighing mechanism to offset corresponding portions of the load on the scale.

14. In a scale, in combination, weighing mechanism, means for operating an adding machine, comprising a set of electrically-operated tappets each for the units, tens and hundreds keys of an adding machine, a set of circuits for each set of tappets, and a device for closing a circuit of each set, said device being controlled respectively by movement of the weighing mechanism to offset a corresponding part of the load on the scale.

15. In a scale, in combination, weighing mechanism, a pivoted member, means to move said pivoted member, means controlled by movement of the weighing mechanism to limit the movement of said pivoted member, a commutator including a set of stationary contacts, a contact connected to said pivoted member to move successively into engagement with said stationary contacts, and a set of key-operating tappets controlled by said commutator.

16. In a scale, in combination, weighing mechanism, a plurality of pivoted members controlled respectively by movement of the weighing mechanism to offset units, tens of units and hundreds of units of weight, a commutator including a set of stationary contacts for each pivoted member, a contact connected to each pivoted member to move successively into engagement with the corresponding stationary contacts, and a set of key-operating tappets controlled by said contacts.

17. In a commutator for controlling key-operating mechanism comprising, in combination, a plurality of pairs of bars, one of the bars of each pair being integral and the other bar being made up of mutually insulated sections, and a roller engaging the bars of each pair and movable therealong.

18. An adding machine operating device comprising, in combination, a commutator, said commutator consisting of a plurality of pairs of bars, one of the bars of each pair being integral and the other bar being made up of mutually insulated sections, a roller engaging the bars of each pair and movable therealong, solenoids each electrically connected to one of said integral bars and a section of one of said sectional bars, and a key-operating tappet actuated by each solenoid.

SAMUEL G. CRANE.

Witnesses:
C. O. MARSHALL,
C. E. WILCOX.